(12) United States Patent
Dawley et al.

(10) Patent No.: US 11,621,462 B2
(45) Date of Patent: Apr. 4, 2023

(54) BATTERY MODULES WITH FINGER-PROOF ELECTRICAL TERMINALS FOR BOLTED BUSBAR CONNECTIONS

(71) Applicant: GM GLOBAL TECHNOLOGY OPERATIONS LLC, Detroit, MI (US)

(72) Inventors: Evan J. Dawley, Bloomfield Hills, MI (US); Phillip D. Hamelin, Clarkston, MI (US); Scott W. Vaubel, Attica, MI (US); Andrew P. Oury, Troy, MI (US); Neil A. Patel, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 17/174,739

(22) Filed: Feb. 12, 2021

(65) Prior Publication Data

US 2022/0263207 A1 Aug. 18, 2022

(51) Int. Cl.
| | |
|---|---|
| *H01M 50/56* | (2021.01) |
| *H01M 50/505* | (2021.01) |
| *H01M 50/517* | (2021.01) |
| *H01M 50/204* | (2021.01) |

(52) U.S. Cl.
CPC ......... *H01M 50/56* (2021.01); *H01M 50/204* (2021.01); *H01M 50/505* (2021.01); *H01M 50/517* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 1,642,224 A | * | 9/1927 | Bowen ................ H01M 50/172 429/127 |
| 6,641,942 B1 | | 11/2003 | Rouillard et al. |
| 8,035,986 B2 | | 10/2011 | Koetting et al. |
| 9,178,192 B2 | | 11/2015 | Payne |
| 9,872,396 B2 | | 1/2018 | Dawley |
| 9,912,018 B2 | * | 3/2018 | Dawley ................ H01M 50/211 |
| 10,530,019 B2 | | 1/2020 | Dawley et al. |
| 10,569,634 B2 | | 2/2020 | Dawley |
| 10,680,226 B2 | | 6/2020 | Dawley |

(Continued)

*Primary Examiner* — Carmen V Lyles-Irving
(74) *Attorney, Agent, or Firm* — Quinn IP Law

(57) ABSTRACT

Presented are finger-proof electrical terminals for battery assemblies, methods for making/using such electrical terminals, and vehicles with battery modules having finger-proof electrical terminals for bolted busbar connections. A battery assembly includes one or more electrochemical battery cells and one or more electrical terminals each electrically connected to the battery cell(s) and having a contact face to electrically connect the battery assembly to an electrical connector. A threaded nut attaches each electrical terminal to one of the electrical connectors. An electrically insulating nut cap is attached to each threaded nut. A battery housing, which stores therein the battery cell(s), includes an electrically insulating housing wall with one or more terminal jackets each mounting therein one of the electrical terminals. Each terminal jacket has a jacket window that circumscribes one of the nut caps, spaced therefrom by a predefined clearance sufficient to expose the contact face of the electrical terminal.

17 Claims, 8 Drawing Sheets

(56) References Cited

U.S. PATENT DOCUMENTS

| | | |
|---|---|---|
| 2013/0252052 A1 | 9/2013 | Dawley |
| 2014/0178744 A1* | 6/2014 | Zhu .................... H01M 50/517 |
| | | 429/178 |
| 2015/0017508 A1 | 1/2015 | Khakhalev |
| 2015/0162571 A1 | 6/2015 | Ogg et al. |
| 2016/0336552 A1 | 11/2016 | MacLean et al. |
| 2018/0034012 A1* | 2/2018 | Yu ....................... H01M 50/249 |
| 2019/0126770 A1 | 5/2019 | Koch et al. |
| 2020/0274204 A1 | 8/2020 | Dawley |
| 2020/0358051 A1 | 11/2020 | Dawley |
| 2020/0403197 A1 | 12/2020 | Dawley |

* cited by examiner

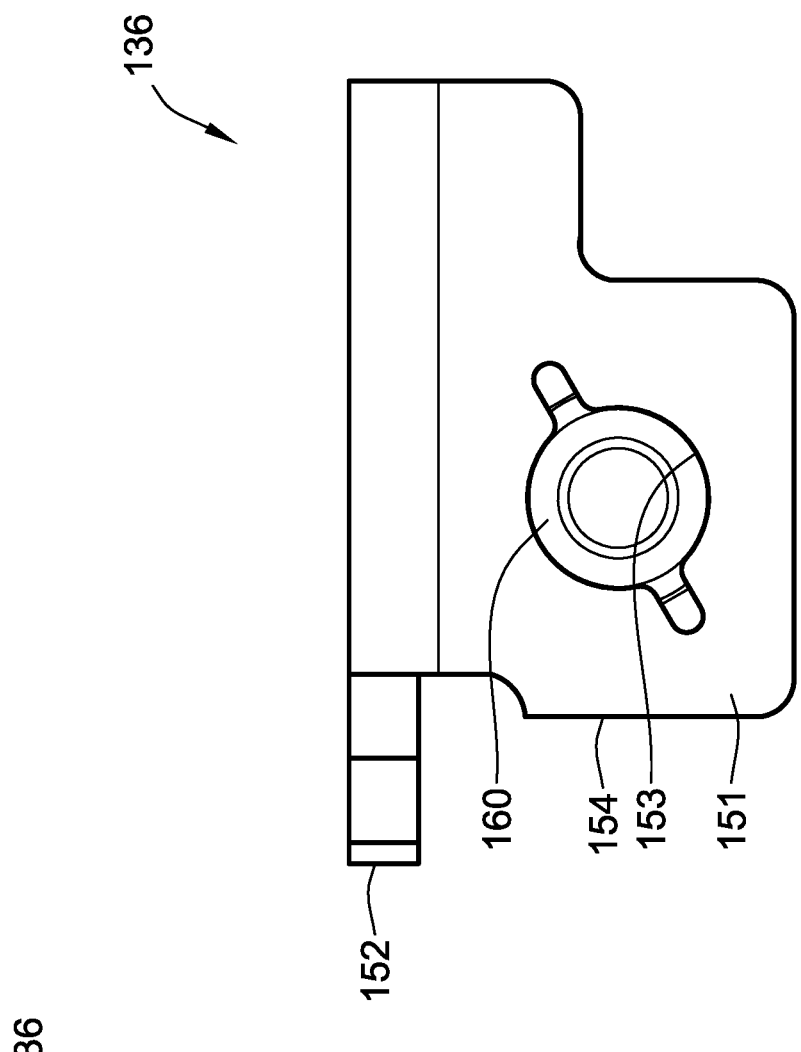
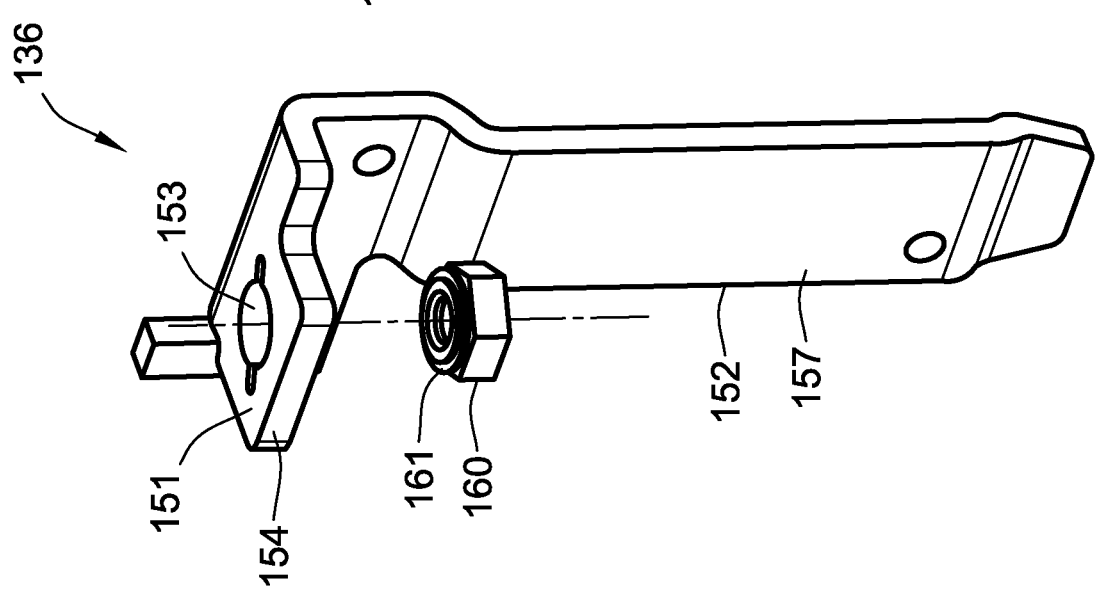
FIG. 5B
FIG. 5A

BATTERY MODULES WITH FINGER-PROOF ELECTRICAL TERMINALS FOR BOLTED BUSBAR CONNECTIONS

INTRODUCTION

The present disclosure relates generally to electrochemical devices. More specifically, aspects of this disclosure relate to rechargeable battery modules with electrical terminals for bolted module-to-module connections.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric (collectively "electric-drive") vehicles, on the other hand, utilize alternative power sources to propel the vehicle and, thus, minimize or eliminate reliance on a fossil-fuel based engine for tractive power.

A full electric vehicle (FEV)—colloquially labeled an "electric car"—is a type of electric-drive vehicle configuration that altogether omits the internal combustion engine and attendant peripheral components from the powertrain system, relying on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid electric and full electric vehicles employ a rechargeable traction battery pack to store and supply the requisite power for operating the powertrain's traction motor unit(s). In order to generate tractive power with sufficient vehicle range and speed, a traction battery pack is significantly larger, more powerful, and higher in capacity (Amp-hr) than a standard 12-volt starting, lighting, and ignition (SLI) battery. Compared to the single cell of an SLI battery, contemporary traction battery packs group stacks of battery cells into individual battery modules, which are then mounted onto the vehicle chassis, e.g., by a battery pack housing or support tray. Stacked electrochemical battery cells may be connected in series or parallel through use of an electrical interconnect board (ICB). In this instance, the electrical tabs of the battery cells project out from the module housing, are bent against, and then welded to shared busbar plates of the ICB. The individual battery modules are then electrically connected together via intermodule busbars or cables. A dedicated Electronic Battery Control Module (EBCM), through collaborative operation with a Powertrain Control Module (PCM) and Traction Power Inverter Module (TPIM), regulates the opening and closing of battery pack contactors to govern operation of the battery pack.

SUMMARY

Presented herein are finger-proof electrical terminals for battery module assemblies, methods for making and methods for using such electrical terminals, and electric-drive vehicles equipped with rechargeable battery modules having finger-proof electrical terminals for bolted module-to-module connections. By way of example, bolted electrical terminal designs are presented that integrate low-profile, finger-proofing features to prevent inadvertent contact between an electrified terminal surface and an operator or a tool. The electrical terminal may be assembled to an integrated interconnect board assembly of the battery module; the ICB assembly may have a complementary terminal shielding feature that mates with the terminal's shielding feature to enhance finger-proofing of the assembly. These finger-proof electrical terminals allow for safe and simplified battery pack assembly along with improved voltage scalability in a multi-module traction battery pack while enabling an electric device, such as a traction motor, to electrically couple to and, thus, draw an electrical load from the module.

In a representative architecture, the ICB assembly and electrical terminal contain complementary electrically insulating features that mate with each other to provide a minimum standoff distance that electrically isolates the charged surfaces of the terminal while still allowing for mating of the terminal to a busbar. These mating features may include a plastic outer jacket of the ICB assembly that sheaths the terminal, and a plastic hollow cap that covers a threaded nut (e.g., steel clinch nut or T-nut) mounted on the terminal's charged surface. A busbar-facing surface of the outer jacket has a window circumscribed by an outer (ring-shaped) frame that concentrically aligns with a distal end of the nut cap, which acts as an inner (ring-shaped) landing. The nut cap receives therethrough a bolt that is torqued into the threaded nut to secure a busbar to the module. When mated, the outer jacket window provides restricted radial clearance with the nut and cap sufficient to allow for electrical contact between the terminal and busbar while concomitantly preventing a finger from passing through and contacting the terminal face.

As noted above, the concentric shapes of the ICB and terminal's mating terminal-shielding features—be it concentrically aligned circles, ovals, polygons, etc.—have sufficient separation to allow for a busbar connection to the bearing surface of the terminal and, at the same time, preclude pass-through of small digits and electrically conductive tools. The bolt hole of the electrical terminal may be fabricated with a flow-through keyhole feature that enables plastic overmolding of the cap and jacket, e.g., as a single-piece structure, at the terminal-level or at the ICB-level. For bipartite constructions, an outer surface of the internally threaded nut may have a radially recessed slot that enables installation of a plastic nut cap, e.g., with a snap-fit rib or nubs projecting radially inward from in internal surface of the cap. Other bipartite constructions may include a nut cap with a circular array of axially projecting nubs that press-fit into a complementary hole pattern in the exposed surface of the electrical terminal. Compared to the overmolded one-piece designs and the snap-fit or press-fit two-piece designs, a third option is a tripartite clamshell design that includes an inner ICB frame and an outer ICB cover. The frame and cover couple together, e.g., via snap-fit projections and/or fasteners, to sandwich therebetween the terminal and to cooperatively define the ICB assembly's finger-proofing window on the charge surface of the terminal. For these tripartite configurations, the electrical terminal may employ any of the herein described nut cap designs.

Aspects of this disclosure are directed to finger-proof electrical terminals for battery assemblies. For example, a battery assembly is presented for powering an electric load, such as a motor, via an electrical connector, such as a busbar. The battery assembly includes one or more electrochemical battery cells, one or more electrical terminals electrically connected to the battery cell(s), and a protective battery housing storing therein the battery cell(s). Each electrical terminal electrically connects the battery cell(s) and, thus, the battery assembly to one of the electrical connectors. A threaded nut attaches each electrical terminal to the electrical connector, e.g., via a bolt or similarly suitable fastener. In addition, an electrically insulating nut cap is attached to each terminal and threaded nut. The battery housing includes an electrically insulating housing wall with one or more terminal jackets each mounting therein and covering a respective one of the electrical terminals. Each terminal jacket has a jacket window that circumscribes the nut cap, spaced therefrom by a predefined clearance sufficient to expose the contact face for coupling with the electrical connector while preventing contact of a human digit with the terminal's contact face. Disclosed finger-proof terminals and battery assemblies may be implemented for both automotive and non-automotive applications alike.

Additional aspects of this disclosure are directed to motor vehicles equipped with rechargeable battery assemblies having finger-proof electrical terminals for bolted electrical connections. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an electric-drive vehicle includes a vehicle body with a passenger compartment, multiple road wheels mounted to the vehicle body, and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the electric-drive vehicle.

Continuing with the discussion of the above example, the vehicle also includes at least one rechargeable traction battery pack that is mounted onto the vehicle body and operable to power the vehicle powertrain's traction motor(s). The traction battery pack contains an array of battery modules, each of which includes multiple electrochemical battery cells, multiple electrical terminals electrically connected to the battery cells, and a battery housing storing therein the battery cells. Each terminal has a contact face that electrically connects the battery module to a respective electrical busbar connector. A threaded nut attaches each electrical terminal to its respective busbar, e.g., via a threaded bolt. Additionally, an electrically insulating nut cap is seated against each nut and mounted on one of the electrical terminals. The battery housing includes an electrically insulating housing wall with multiple terminal jackets, each of which mounts therein a respective one of the electrical terminals. Each terminal jacket has a jacket window that circumscribes one of the nut caps; the inner periphery of the window is spaced from the nut cup by a predefined clearance sufficiently wide to expose the contact face for electrically connecting to the busbar yet sufficiently narrow to prevent a human digit from passing therebetween.

Aspects of this disclosure are also directed to manufacturing systems and methods for making any of the disclosed finger-proof electrical terminals, battery modules, and/or motor vehicles. In an example, a method is presented for manufacturing a battery assembly. This representative method includes, in any order and in any combination with any of the above and below disclosed options and features: locating an electrochemical battery cell within a battery housing, the battery housing including an electrically insulating housing wall with a terminal jacket; mounting an electrical terminal to the housing inside the terminal jacket, the electrical terminal having a contact face configured to electrically connect the battery assembly to the electrical connector; electrically connecting the electrical terminal to the battery cell; attaching a threaded nut to the electrical terminal, the threaded nut configured to attach the electrical terminal to an electrical connector; and attaching an electrically insulating nut cap to the threaded nut, the terminal jacket defining a jacket window circumscribing the nut cap and spaced therefrom by a predefined clearance sufficient to expose the contact face of the electrical terminal.

For any of the disclosed terminals, methods, and vehicles, the predefined clearance may define a gap distance between an inner periphery of the jacket window and an outer periphery of the nut cap. In this instance, the predefined clearance may be approximately 3 mm to approximately 8 mm wide (e.g., less than a height of a pinkie finger of an average human adult). As yet a further option, the nut cap and terminal jacket may be formed as a unitary, single-piece structure from a polymeric material. In this instance, the electrical terminal may have a bolt hole that receives therethrough a bolt; the threaded nut may be mounted directly to the electrical terminal at one end of the bolt hole. The bolt hole may have multiple circumferentially spaced, axially elongated slots that receive therethrough polymeric material that connects the nut cap and terminal jacket, e.g., as part of an overmolding process. Optionally, the nut cap may have a hollow body that is seated on a longitudinal (top) end of the threaded nut and receives therethrough the bolt for mechanically fastening the electrical connector to the terminal.

For any of the disclosed terminals, methods, and vehicles, the jacket window may have a circular geometry, and the nut cap may have a toroidal geometry. In this example, the jacket window is concentrically aligned with and circumscribes the nut cap. Moreover, the housing wall may include an outer frame that protrudes from the terminal jacket; the outer frame is contiguous with and circumscribes the jacket window. As a further option, the electrical terminal may have an L-shaped geometry with a flange projecting orthogonally from an elongated body. In this example, the contact face is located on one side of the flange and the threaded nut is mounted on another side of the flange opposite the contact face. The body of the electrical terminal may include another contact surface that abuts an electrical tab of the battery cell. In this example, the terminal jacket may include a second jacket window exposing this contact face.

For any of the disclosed terminals, methods, and vehicles, the threaded nut may include an outer surface with a single recessed groove or multiple recessed grooves. In this instance, the nut cap may include an inner surface with one or more inwardly projecting ribs or nubs that snap-fit into the recessed groove(s) to thereby mount the nut cap on the threaded nut. As a further option, the electrical terminal may include a circular array of countersunk holes. In this example, the nut cap may include an end surface with a circular array of axially projecting nubs that press-fit into the countersunk holes thereby mounting the nut cap on the contact face of the electrical terminal. The housing wall may have a clamshell construction with a cover mounted to a frame to cooperatively define the terminal jacket and, at the same time, sandwich therebetween the electrical terminal. Each threaded nut may be a clinch nut or a T-nut that is self-anchored to the electrical terminal.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIGS. 5A and 5B are perspective-view and plan-view illustrations, respectively, of the electrical terminal and clinch nut of FIGS. 4A and 4B.

Figure 1:
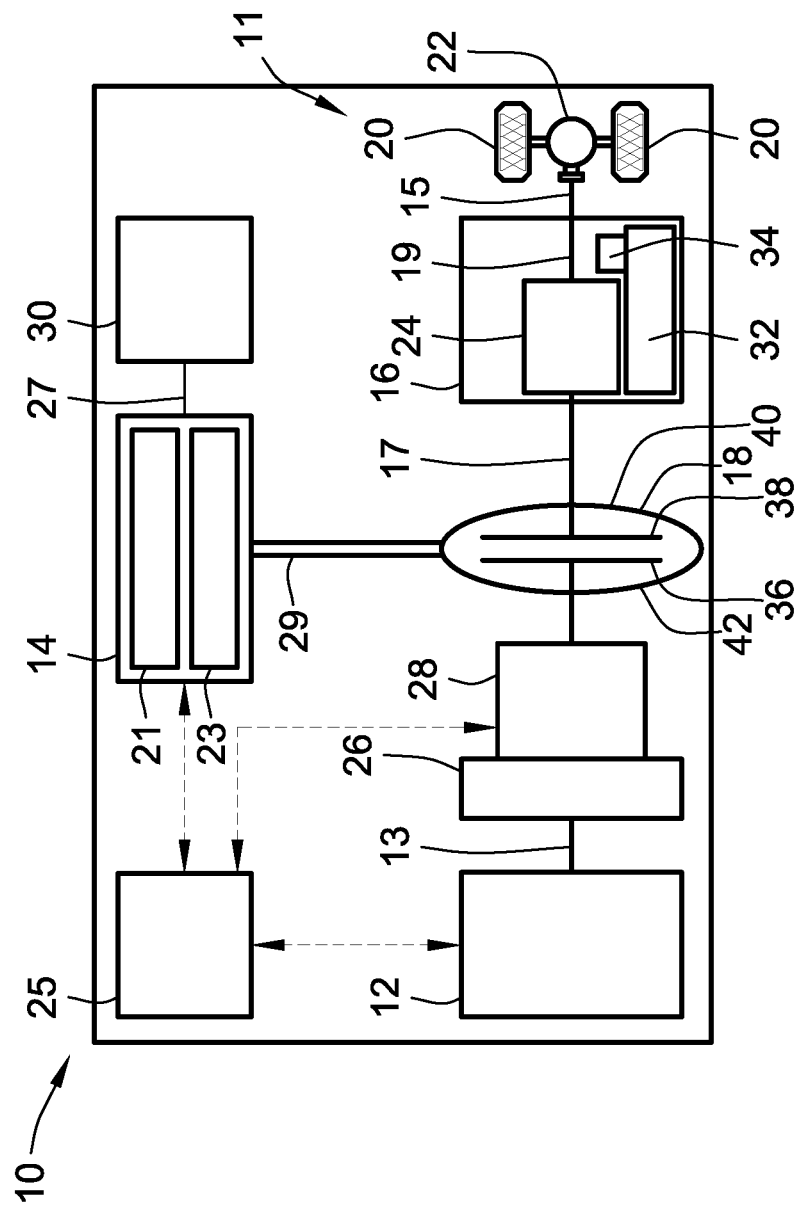
FIG. 1 is a schematic illustration of a representative electric-drive motor vehicle with a hybrid powertrain having an electric traction motor powered by a rechargeable traction battery pack and drivingly connected to a final drive system via a multi-speed power transmission in accordance with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects of this disclosure may be practiced. In the same vein, implementation of the present concepts into a hybrid electric powertrain should also be appreciated as a representative implementation of the novel concepts disclosed herein. As such, it will be understood that facets of the present disclosure may be applied to other powertrain architectures, incorporated into any logically relevant type of motor vehicle, and utilized for both automotive and non-automotive applications alike. Lastly, only select components have been shown and will be described in additional detail herein.

Nevertheless, the motor vehicles and battery assemblies discussed below may include numerous additional and alternative features, and other available peripheral components and hardware, for carrying out the various methods and functions of this disclosure.

The representative vehicle powertrain system is shown in FIG. 1 with a prime mover—represented herein by a restartable internal combustion engine (ICE) assembly 12 and an electric motor/generator unit (MGU) 14—that drivingly connects to a driveshaft 15 of a final drive system 11 by a multi-speed automatic power transmission 16. The engine 12 transfers power, preferably by way of torque via an engine crankshaft 13 (also referred to herein as "engine output member"), to an input side of the transmission 16. Engine torque is first transmitted via the crankshaft 13 to rotate an engine-driven torsional damper assembly 26, and concomitantly transferred through the torsional damper assembly 26 to an engine disconnect device 28. This engine disconnect device 28, when operatively engaged, transmits torque received from the ICE assembly 12, by way of the damper 26, to input structure of the torque converter (TC) assembly 18. As the name implies, the engine disconnect device 28 may be selectively disengaged to drivingly disconnect the engine 12 from the motor 14, TC assembly 18, and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for the supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a motor support hub, shaft, or belt 29 (also referred to herein as "motor output member") to the hydrodynamic torque converter 18. The torque converter 18, in turn, drivingly connects the motor 14 to an input shaft 17 ("transmission input member") of the transmission 16. The electric motor/generator unit 14 is composed of an annular stator assembly 21 circumscribing and concentric with a cylindrical rotor assembly 23. Electric power is provided to the stator 21 through a high-voltage electrical system, including electrical conductors/cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture, the vehicle 10 may employ other HEV/FEV/ICE powertrain configurations.

Power transmission 16 may use differential gearing 24 to achieve selectively variable torque and speed ratios between transmission input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes, are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrodynamic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in facing serial power-flow fluid communication with the turbine 38. A stator (not shown) is interposed between the impeller 36 and turbine 38 to selectively alter fluid flow therebetween. The transfer of torque from the engine output members 13 and motor output member 29 to the transmission 16 via the TC assembly 18 is through stirring excitation of hydraulic fluid, such as transmission oil, inside the TC's internal fluid chamber caused by rotation of the impeller and turbine 36, 38 blades. To protect these components, the TC assembly 18 is constructed with a TC pump housing, defined principally by a transmission-side pump shell 40 fixedly attached to an engine-side pump cover 42 such that a working hydraulic fluid chamber is formed therebetween.

Figure 2:
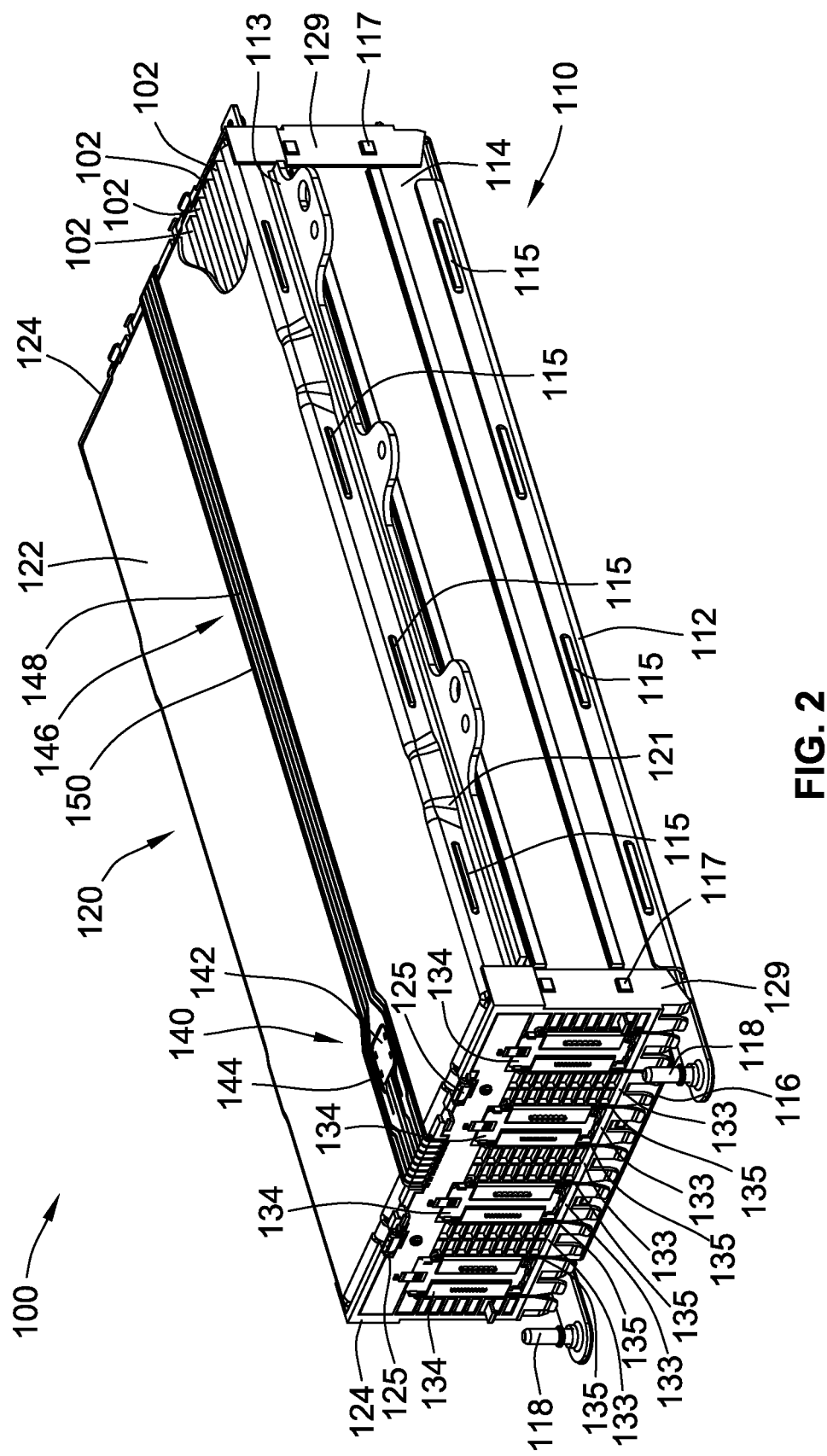
FIG. 2 is an elevated, perspective view illustration of a representative battery module with an integrated electrical interconnect board (ICB) assembly and finger-proof electrical terminals in accordance with aspects of the present disclosure.

Turning next to FIG. 2, there is shown a segment of an in-vehicle rechargeable energy storage system (RESS) that is adapted for storing and supplying high-voltage electrical energy used for propelling an electric-drive vehicle, such as hybrid electric vehicle 10 of FIG. 1. This RESS may be a deep-cycle, high-ampere capacity battery system rated for approximately 350 to 800 VDC or more, for example, depending on a desired vehicle range, gross vehicle weight, and power ratings of the various accessory loads drawing electrical power from the RESS. To this end, the RESS employs one or more high-voltage, high-energy-density battery packs, such as traction battery pack 30 of FIG. 1, that is electrically connectable to one or more polyphase permanent magnet (PM) electric machines, such as traction motor 14.

Figure 3:
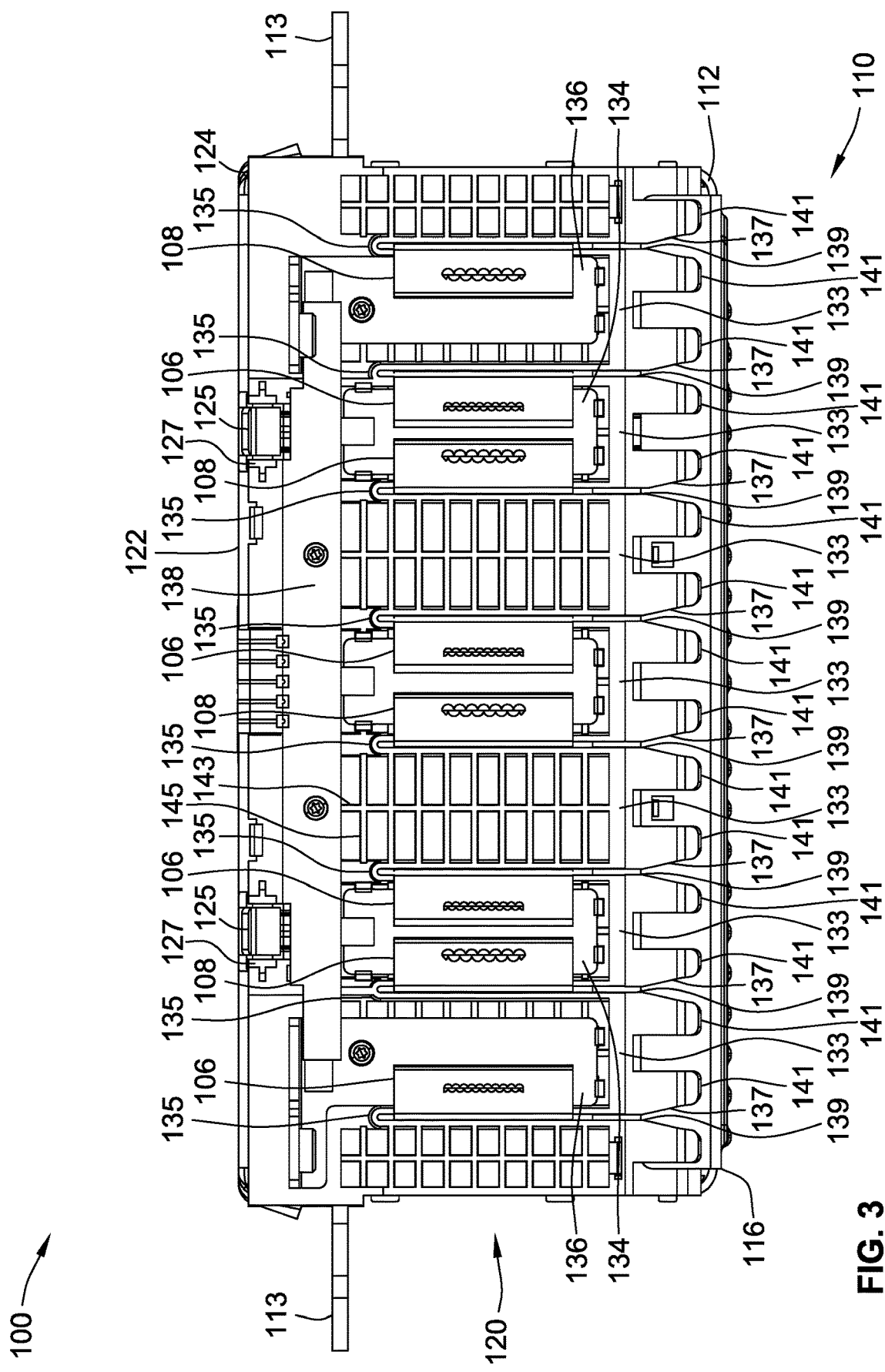
FIG. 3 is an end-view illustration of the representative battery module of FIG. 2 with the mating finger-proofing features removed to show two electrical terminals mated to an end wall of the ICB assembly.

According to the representative configuration, the traction battery pack is generally composed of an array of lithium-ion battery modules, an example of which is illustrated at 100 in FIGS. 2 and 3. These battery modules 100 may be arranged in a pattern of rows and columns and may be buttressed on a battery support tray (not shown) that provides subjacent support for the battery packs during vehicle operation. Aspects of the disclosed concepts may be similarly applicable to other electric storage unit architectures, including those employing nickel metal hydride (NiMH) batteries, lead acid batteries, lithium polymer batteries, or other applicable type of rechargeable electric vehicle battery (EVB). Each battery module 100 may include a series of electrochemical battery cells, such as pouch-type lithium ion (Li-ion) or Li-ion polymer battery cells 102, for example.

An individual lithium-ion battery module 100 may be typified by multiple battery cells 102 (e.g., 20-45) that are stacked in side-by-side facing relation with one another and connected in parallel or series for storing and supplying electrical energy. A battery cell 102 may be a multi-layer construction that is provided with an outer battery casing, such as an envelope-like pouch. The respective sides of the pouch may be formed of aluminum, steel, or other suitable material, both sides of which may be covered with a polymeric coating that insulates the metal from the cell elements and from adjacent cells. These two sides are connected, e.g., via welding or crimping, to generally enclose therein a liquid electrolyte composition that conducts positive Lithium ions between working electrodes. Extending outwardly from opposing longitudinal edges of the pouch are negative (anode) and positive (cathode) terminals for making electrical connections with negative and positive electrodes (not visible) packaged within the internal volume of cell pouch. While described as a silicon-based, Li-ion "pouch cell" battery, the battery cells may be adapted to other constructions, including cylindrical and prismatic constructions.

With collective reference to FIGS. 2 and 3, the battery module 100 stores the electrochemical battery cells 102 inside a protective, electrically insulating battery module housing 110. Battery module housing 110 may be a rigid, multi-part construction assembled from a flanged housing base 112 with a pair of elongated sidewalls 114 that project generally orthogonally from the base 112. Once properly arranged and mounted, the stacked battery cells 102 are supported on the housing base 112 and sandwiched between the module sidewalls 114. For ease of manufacture and assembly, the sidewalls 114 may be substantially identical to each other, both formed from a rigid plastic material with snap fastener projections 115 and 117 for aligning and connecting the sidewalls 114 with the other protective exterior segments of the battery module 100. Two coplanar mounting brackets 113 extend transversely from the module housing 110, each integrally formed with and projecting at a right angle from a respective module sidewall 114.

A cooling plate 116 is mounted underneath the stacked battery cells 102, seated generally flush against the bottom surface of the housing base 112, to selectively transfer heat out of the battery module 100. This cooling plate 116 is fabricated with one or more coolant channels (not visible in the views provided) that pass therethrough a coolant fluid received via coolant ports 118. The module sidewalls 114 and cooling plate 116 may be fluidly sealed and mechanically attached to the housing base 112, e.g., via snap fasteners and a seal-forming foam. While shown with a generally rectangular-polyhedron shape, it is envisioned that the battery module housing 110 may take on other sizes and shapes to accommodate alternative applications with different packaging and design constraints.

Operatively aligning and electrically interconnecting the battery cells is an integrated interconnect board (ICB) assembly 120 that is mounted on top of the battery module housing 110. In accord with the illustrated example, the integrated ICB assembly 120 provides a protective shell that is generally defined by a flanged central cover 122 with a pair of flanged endwalls 124 that project generally orthogonally from opposing ends of the central cover 122. The central cover 122 is formed from a rigid polymeric material with integral lateral flanges 121 having elongated snap fastener slots, which receive therein snap fastener projections 115 of the housing sidewalls 114. A pair of snap-in hooks 125 projects from each longitudinal end of the cover 122 and receives therein mounting pivot pins 127 (FIG. 3) of the ICB endwalls 124. Each endwall 124 is fabricated with integral mounting flanges 129 that have snap fastener holes, which receive therein snap fastener projections 117 of the housing sidewalls 114.

Turning next to FIG. 3, each of the ICB assembly endwalls 124 is segmented into a series of elongated, mutually parallel endwall plates 133 that are arranged side-by-side in a vertical column-like fashion. These endwall plates 133 interleave with and are separated from one another by elongated slots 135. Each of the endwall plates 133 is integrally formed with a succession of flexible snap fastener tabs 141 that project downwardly from a distal edge of the endwall 124. These tabs 141 slidably engage with and press-fit onto the cooling plate 116; in so doing, the integrated ICB assembly 120 mechanically attaches to the battery module housing 110. As best seen in FIG. 3, each endwall plate 133 may be integrally formed with intersecting vertical and horizontal ribs 143 and 145, respectively, that cooperatively structurally reinforce the endwall 124.

A series of vertical slots 135 formed into the opposing endwalls 124 allow the integrated ICB assembly 120 to mount vertically onto the cell stack and comb the cell tabs 106 and 108 during ICB installation. According to the representative example of FIG. 3, each elongated slot 135 extends upwardly from a bottom-most distal edge of the endwall 124 to slidably receive (e.g., from bottom to top in the Figures) a respective one of the electrical tabs 106, 108. Each of the elongated slots 135 includes a variable width lead-in slot segment 137 that opens at the bottom-most distal edge of the endwall 124, and a rectilinear main slot segment 139 adjoining the lead-in slot segment 137. With this configuration, positive and negative terminals projecting from longitudinal ends of the battery cells extend through elongated slots in the ICB endwalls 124.

After mounting the integrated ICB assembly 120 onto the battery module housing 110, the electrical tabs 106, 108 of the battery cells are electrically connected to electrical busbar connectors 134 attached to the ICB endwalls 124. As shown, each electrical busbar connector 134 may be fabricated as an electrically conductive busbar plate that is mounted on an exterior surface of one of the endwalls 124. Likewise, each of the battery cells' electrical tabs 106, 108 may be an electrically conductive L-shaped terminal, a portion of which lays flush again and solders, welds or clips to one of the busbar plates 134. A pair of L-shaped inter-module bussing brackets 136 (also referred to herein as "electrical terminals") are mounted on one of the ICB endwalls 124. These inter-module bussing brackets 136 electrically connect the battery module 100 to an adjacent battery module. A bussing crossbar 138 mounted on the endwall 124 operates to electrically connect both inter-module bussing brackets 136 to the electrical busbar connectors 134.

In addition to providing a protective covering and electrically interconnecting the battery cells, the ICB assembly 120 also provides sensing, operating, and electrical isolation functionalities. Such functionality may be provided by an integrated circuit (IC) sensing assembly 140 that is mounted on the central cover 122. The IC sensing assembly 140 is fabricated with multiple sensing devices 142, such as current, voltage, and/or temperature sensors, that are operable to sense dynamic operating characteristics of the battery cells. A flexible printed circuit board (PCB) 144 is shown mounted on the central cover 122, supporting thereon the sensing devices 142. A flexible electrical track 146 with multiple electrical traces 148 borne by an electrically insulating track sheet 150 electrically connects the flexible PCB 144 and, thus, the sensing devices 142 to the battery cells via the busbar connectors 134.

During the assembly of a high-voltage (HV) battery assembly, such as battery module 100 of FIG. 2, and the subsequent installation of the HV battery assembly, such as during line assembly of vehicle 10, the HV terminals have large contact surfaces that, if left exposed, may pose hazardous to a line operator or assembly line robot. By way of non-limiting example, once the electrical tabs 106, 108 of the stacked battery module cells are welded to the ICB's endwall busbar connectors 134 and terminals 136, the module terminals 136 are energized ("hot"). If the energized terminals 136 are inadvertently touched by a tool or a finger, a line operator or robot could be shocked or damaged. Due to packaging constraints for a vehicle's traction battery pack, the HV terminals of neighboring modules may be in very close proximity to one another. A short circuit condition may occur—if both terminals are touched simultaneously, leading to a damaged pack requiring repair or replacement. To mitigate against a possibility of module damage or line operator shock, discussed below are finger-proof electrical terminals with low-profile terminal shielding features that help to prevent contact between the charged surfaces of the battery module terminals and the small digits of a line operator or an end effector/tool of an assembly line robot.

The following discussion describes in detail a variety of finger-proof electrical terminal architectures for electrically mating with an electrical conductor and concurrently isolating the terminal to prevent unintentional contact with the terminal's charged surfaces. FIGS. 4A, 4B, 5A and 5B, for example, portray the rechargeable battery module 100 of FIGS. 2 and 3 with a finger-proof electrical terminal assembly, which is designated generally at 132 and is representative of a single-piece, clinch-nut "overmold" design. In particular, the electrical terminal 136 is shown in FIGS. 5A and 5B as an L-shaped structure that may be die stamped, e.g., from copper or aluminum sheet metal, to include an elongated body 152 with a flange 154 projecting generally orthogonally from a distal (top) end of the body 152. Punched through an uppermost (first) contact face 151 of the electrical terminal's flange 154 is a bolt hole 153 through which is received a threaded bolt 156 (FIG. 4A). An internally threaded nut 160 is pressed against an underside face of the flange 154, opposite that of the contact face 151 that electrically connects the battery module 100 to a neighboring module or TPIM. For ease of manufacture and simplicity of design, both the positive and negative bussing brackets 136 of FIG. 3 may be structurally identical to the example terminal 136 shown in FIGS. 5A and 5B.

An electrical connector—portrayed in FIG. 4A as a high-voltage, direct current (HVDC) busbar 158—is electrically connected to the internal battery cells 102 of module 100 via electrical terminal 136. As shown, the HVDC busbar 158 is an elongated copper bar with a pair of cylindrical terminal interfaces 159, each of which projects orthogonally from a respective end of the busbar 158. Each end of the HVDC busbar 158 is secured to an electrical terminal 136 of a battery module 100 by passing one of the threaded bolts 156 down through the hollow center of the terminal interface 159, into the bolt hole 153 in the terminal flange 154, and threadably mating it with an internally threaded nut 160 seated against an underside face of the flange 154. In this example, the threaded nut 160 is an electrically conductive steel clinch nut that is self-anchored to the electrical terminal 136, e.g., via a toothed clinching ring 161 that swages to the flange 154. A protective, electrically insulating busbar cap 166 may be placed over the busbar 158.

Referring back to FIGS. 4A and 4B, the finger-proof electrical terminal assembly 132 is composed of two main sections: a terminal-shielding outer jacket 162 and a complementary clinch-nut covering cap 164. Both the terminal jacket 162 and the nut cap 164 are formed, in whole or in part, from plastic or other suitable electrically insulating material. In accord with the illustrated example, the terminal jacket 162 and nut cap 164 are molded into the endwall 124 of the ICB assembly 120 as a unitary, one-piece construction. To facilitate the overmolding process, a pair of axially elongated "flow-through" slots 155 is formed through the terminal flange 154; these two slots 155 are spaced circumferentially from each other, located on opposing sides of and adjoining the bolt hole 153. These flow-through slots 155 allow the polymeric material that connects the nut cap 164 to the terminal jacket 162 to pass through the terminal flange 154 and around the clinch nut 160 during molding.

To secure the electrical terminal 136 to the ICB endwall 124, the clinch nut 160 is first anchored to the terminal flange 154 at one end of the bolt hole 153, and the terminal jacket 162 and nut cap 164 are then overmolded onto the terminal-and-nut subassembly. In so doing, the electrical terminal 136 is rigidly mounted inside and covered by the terminal jacket 162 with only select limited portions of the terminal 136 exposed to the exterior of the battery module 100. At the same time, an upper end of the nut cap 164 is seated on top of the clinch nut 160 and terminal contact face 151, whereas a lower end of the nut cap 164 may seat against and at least partially cover a bottom of the clinch nut 160. The nut cap 164 is formed with a hollow cylindrical top end that seats on a longitudinal (upper) end of the clinch nut 160 to receive therethrough one of the bolts 156. An outer diameter surface of the neck of the clinch nut 160 may be exposed through the nut cap 164 such that the clinch nut 160 abuts and thereby electrically mates with the terminal 136.

Figure 4B:
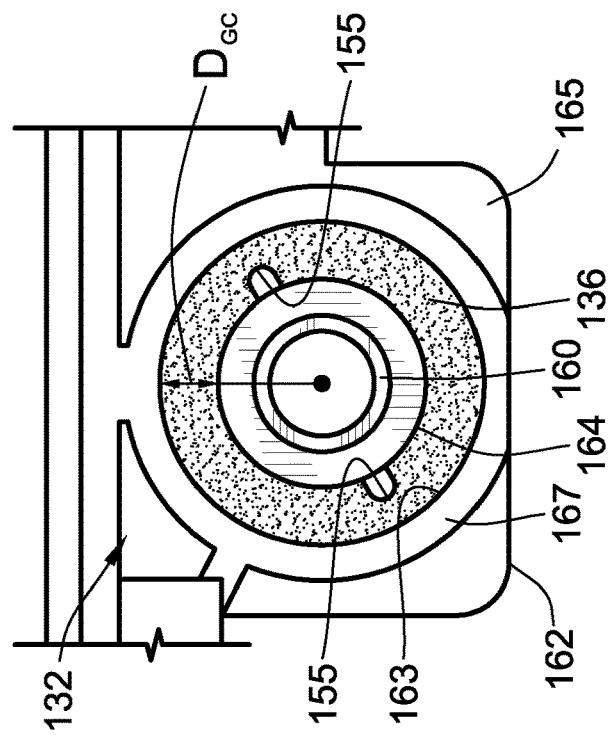
FIGS. 4A and 4B are perspective-view and plan-view illustrations, respectively, of a representative finger-proof electrical terminal with a clinch nut and a single-piece overmolded outer jacket and nut cap in accord with aspects of the disclosed concepts.
Figure 4A:
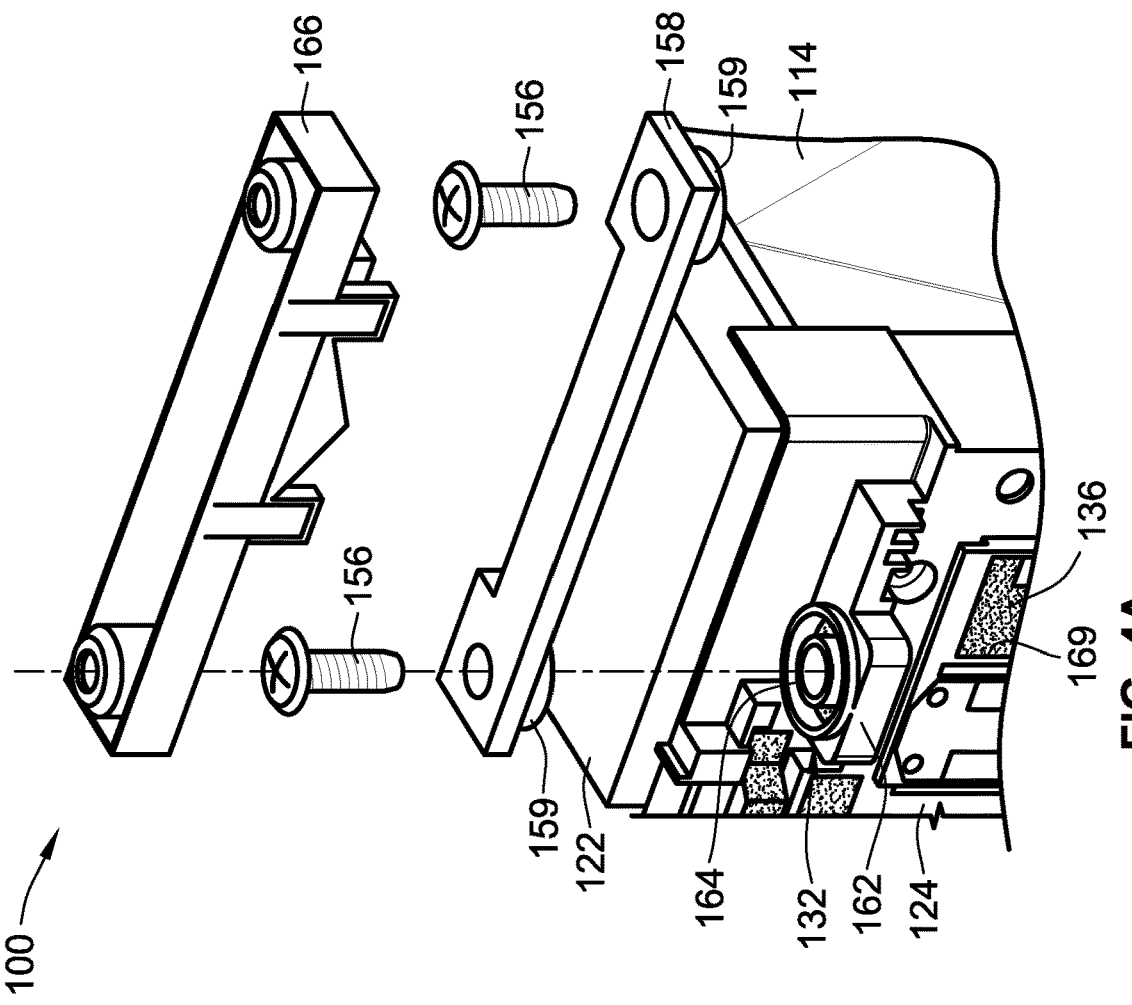

Continuing with the discussion of FIGS. 4A and 4B, the finger-proof electrical terminal assembly 132 employs low-profile, terminal-shielding features to prevent inadvertent contact between an electrified terminal surface and an operator or a tool while still allowing for mating of the terminal 136 to the electrical connector 158. FIG. 4B, for example, shows the terminal jacket 162 with an upper (first) jacket window 163 that extends through a busbar-facing (upper) surface 165 of the jacket 162. Although alternative shapes and sizes are within the scope of this disclosure, the jacket window 163 of FIG. 4B is circular and concentrically aligned with an exposed (upper) end the toroidal nut cap 164. An annular frame 167 protrudes (upwards in FIG. 4A) from the terminal jacket's upper surface 165; the frame 167 surrounds and demarcates the inner perimeter of the jacket window 163. In the illustrated example, the terminal jacket 162 covers a majority of the outboard facing surfaces of the electrical terminal 136, including most of the elongated body 152, from the proximal (bottom) end to the distal (top) end of the body 152, and most of the flange 154 (with the exception of those portions of the body 152 and flange 154 described in the subsequent paragraph).

The window 163 in the terminal-shielding outer jacket 162 circumscribes the nut cap 164 and clinch nut 160, allowing for passage of the bolt 156 into threaded engagement with the nut 160 and the busbar terminal interface 159 into abutting engagement with the terminal 136. The shared inner perimeter of the circular window 163 and annular window frame 167 is spaced from the upper end the nut cap 164 by a predefined clearance that is sufficiently wide to expose the contact face 151 of the electrical terminal 136 for interfacing with the busbar 158 yet sufficiently narrow to prevent the passage of a finger or tool between the cap 164 and frame 167. The predefined clearance is a radial gap distance $D_{GC}$ between an inner periphery of the jacket window 163 and an outer periphery of the exposed end of the nut cap 164. This gap distance $D_{GC}$ may be approximately 3 mm to approximately 8 mm wide or, for at least some embodiments, approximately 3.5 mm to approximately 5.5 mm wide. For at least some desired configurations, the gap distance $D_{GC}$ is less than a smallest dimension (e.g., pad-to-nail height) of a smallest digit (e.g., pinkie finger) of an average human adult. As described above in the discussion of FIG. 3, the body 152 of the electrical terminal 136 has another (second) contact surface 157 that is laser welded to and, thus, electrically connects with one of the battery cell tabs 106, 108. Defined through an outboard face of the terminal jacket 162 is a lower (second) jacket window 169 that exposes the contact surface 157.

Figure 6A:
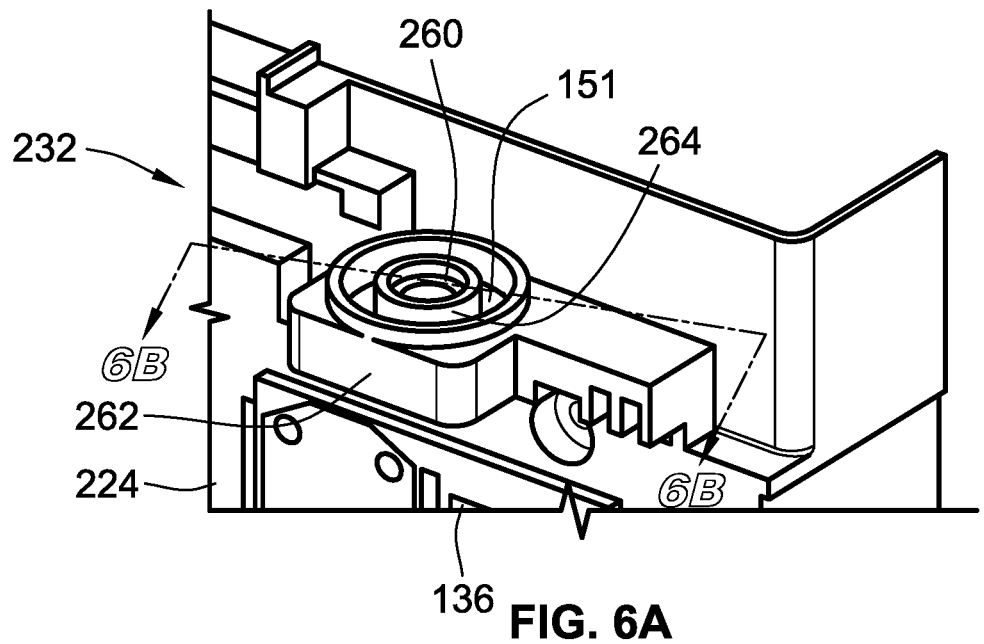
FIGS. 6A and 6B are perspective-view and perspective sectional-view illustrations, respectively, of another representative finger-proof electrical terminal with a T-nut and a single-piece overmolded outer jacket and nut cap in accord with aspects of the disclosed concepts.
Figure 6B:
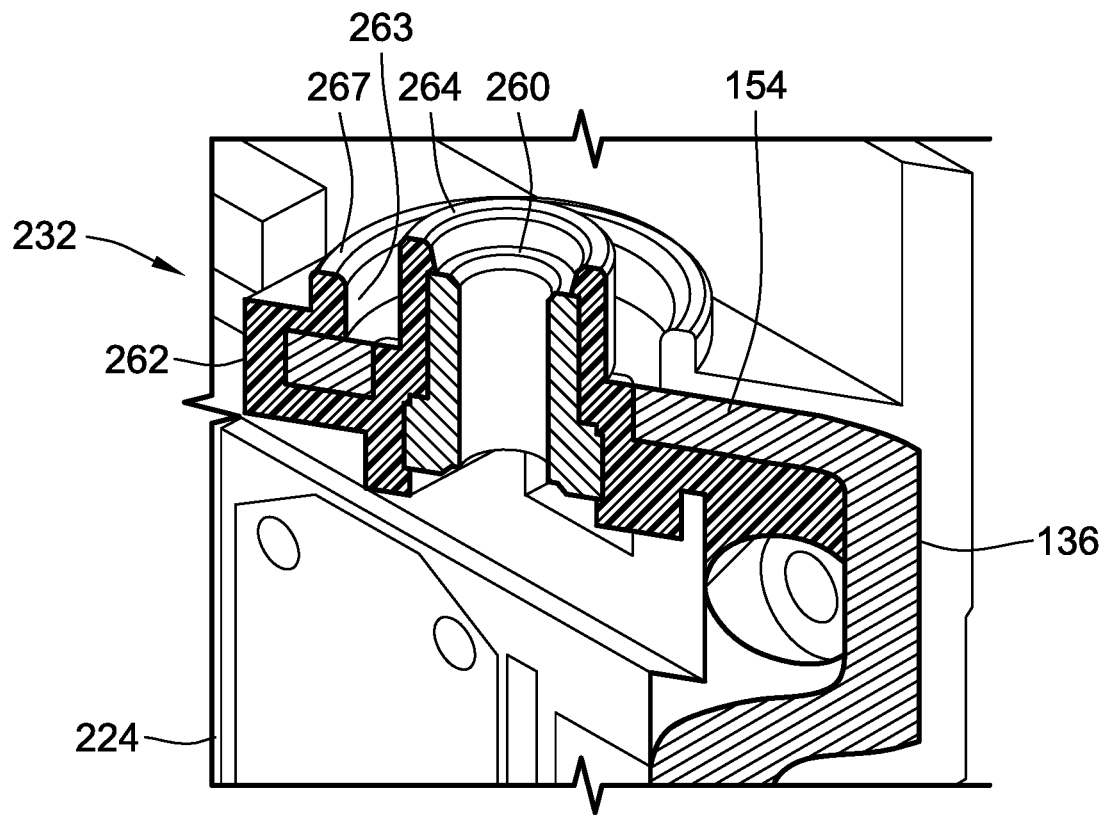

Turning next to FIGS. 6A and 6B, there is shown another example of a finger-proof electrical terminal 232 for a rechargeable battery assembly, such as battery module 100 of FIGS. 2 and 3. Although differing in appearance, it is envisioned that any of the features and options described below with reference to the finger-proof electrical terminal assembly 232 of FIGS. 6A and 6B can be incorporated, singly or in any combination, into the finger-proof electrical terminals shown in the other Figures, and vice versa. Similar to the finger-proof electrical terminal assembly 132 of FIGS. 4A and 4B, for example, the finger-proof electrical terminal assembly 232 of FIGS. 6A and 6B is representative of a single-piece "overmold" design that utilizes the electrical terminal 136 shown in FIGS. 5A and 5B. By way of contrast, the terminal assembly 232 of FIGS. 6A and 6B employs an internally threaded, self-anchoring steel T-nut 260 that is pressed against the underside face of the terminal flange 154 and extends through the flange 154 to the opposite side thereof to project above the contact face 151.

With continuing reference to FIGS. 6A and 6B, the finger-proof electrical terminal assembly 232 is composed of two main sections: a terminal-shielding outer jacket 262 and a complementary clinch-nut covering cap 264. Similar to the jacket 162 and cap 164 of FIGS. 4A and 4B, the terminal jacket 262 and the nut cap 264 of FIGS. 6A and 6B are both formed, in whole or in part, from an electrically insulating material. Moreover, the terminal jacket 262 and nut cap 264 are molded with a battery module housing wall 224 as a unitary, one-piece construction. Once assembled, the electrical terminal 136 is rigidly mounted inside and is covered by the terminal jacket 262, as best seen in the cross-sectional view of FIG. 6B. The nut cap 264 is also shown in FIG. 6B enveloping the T-nut 260 and projecting upwards from the terminal contact face 151. In contrast to the clinch-nut configuration, in which the uppermost surface of the nut cap 164 is coplanar with the uppermost surface of the annular window frame 167, the uppermost surface of the nut cap 264 is offset (e.g., located vertically above) the uppermost surface of the frame 267 of window 263 in the T-nut configuration. With that said, it will be recognized that the T-nut configuration of FIGS. 6A and 6B may use a coplanar arrangement and the clinch-nut configuration of FIGS. 4A and 4B may use a vertical offset arrangement.

Figure 8:
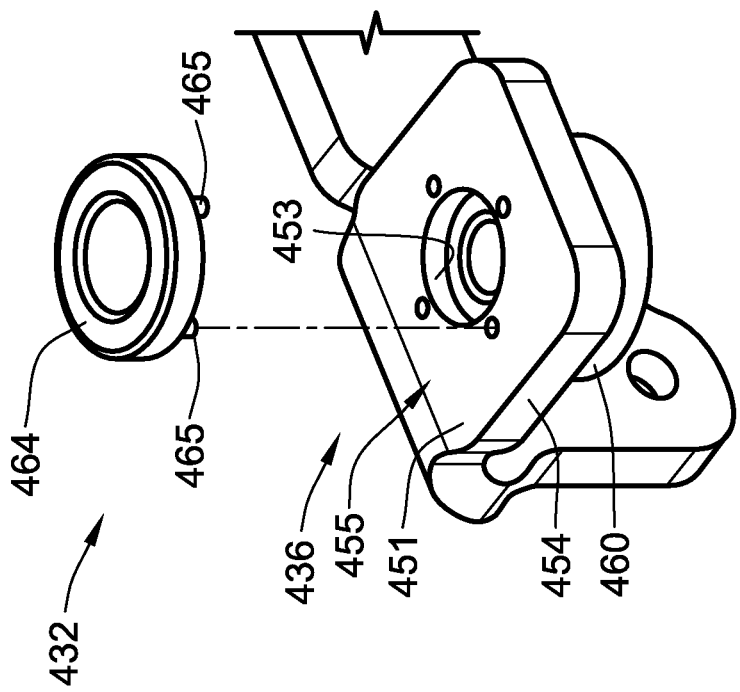
FIG. 8 is a partially exploded, perspective-view illustration of another representative bipartite finger-proof electrical terminal with a T-nut and a complementary press-fit nut cap in accord with aspects of the disclosed concepts.
Figure 7:
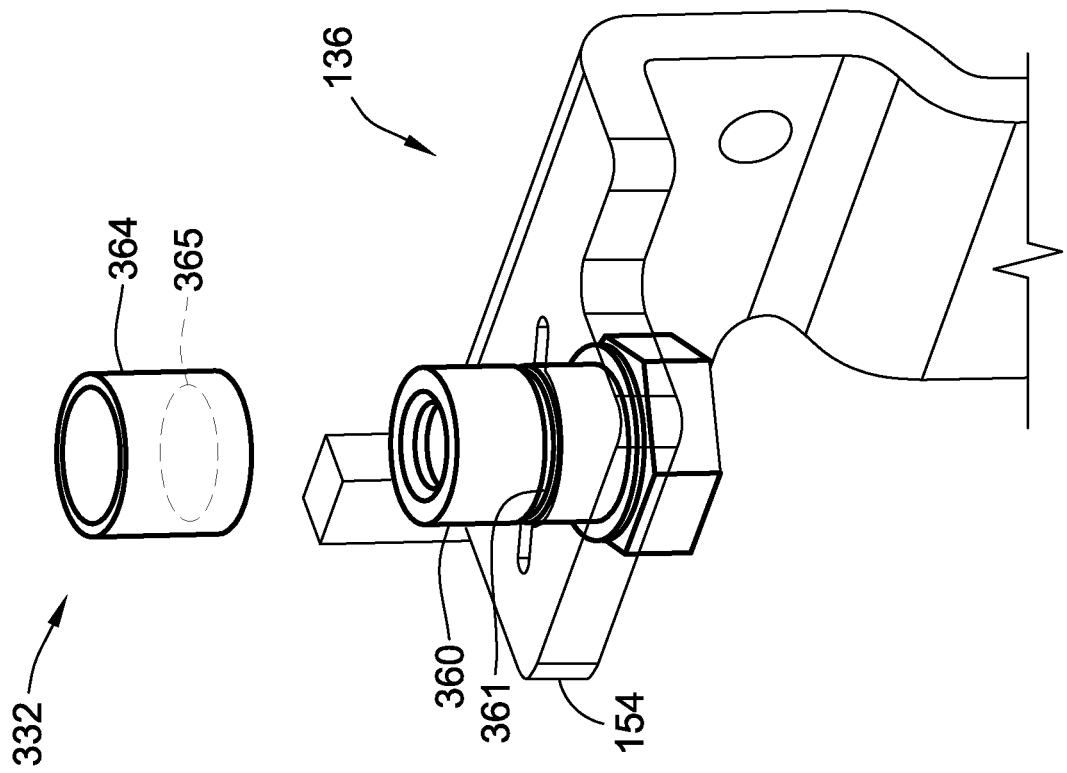
FIG. 7 is a partially exploded, perspective-view illustration of a representative bipartite finger-proof electrical terminal with a clinch nut and a complementary snap-fit nut cap in accord with aspects of the disclosed concepts.

FIGS. 7 and 8 provide additional examples of finger-proof electrical terminal assemblies 332 and 432, respectively, for a rechargeable battery assembly. Presented in FIG. 7, for instance, is an example of a two-piece, snap-fit T-nut design, which is represented by a self-anchoring T-nut 360 and a nut-covering cap 364 that mount on the flange 154 of the electrical terminal 136. An annular recessed groove 361 extends circumferentially around an outer-diameter (OD) surface of the internally threaded neck of the T-nut 360. Projecting radially inward from an inner-diameter (ID) surface of the nut cap 364 is a single or multiple compressible ribs or nubs (shown hidden at 365). When the nut cap 364 is pressed downward onto the cylindrical neck of the T-nut 360, the rib/nub(s) 365 snap-fit into the recessed groove thereby mounting the nut cap on the threaded nut. For either of the illustrated two-piece assemblies, a terminal-shielding outer jacket, which may take on any of the options and alternative described herein, may be fabricated as a separate component and fastened to or overmolded on the terminal 136 to operatively mate with the nut cap 364, 464.

FIG. 8 presents an example of a two-piece, press-fit clinch nut design, which is represented by a self-anchoring clinch nut 460 and a nut-covering cap 464, both of which mount onto a flange 454 of an electrical terminal 436. A circular array of countersunk holes, collectively designated at 455 in FIG. 8, is arranged around a bolt-receiving hole 453 in the flange 454 of the electrical terminal 436. A series of circumferentially spaced nubs 465 project axially from an axial end surface of the nut cap 464. These nubs 465 each press-fit into a respective one of the countersunk holes 455 to thereby secure the nut cap 464 onto the contact face 451 of the terminal flange 454 such that the nut cap 464 covers an upward-facing end of the clinch nut 460.

Figure 9B:
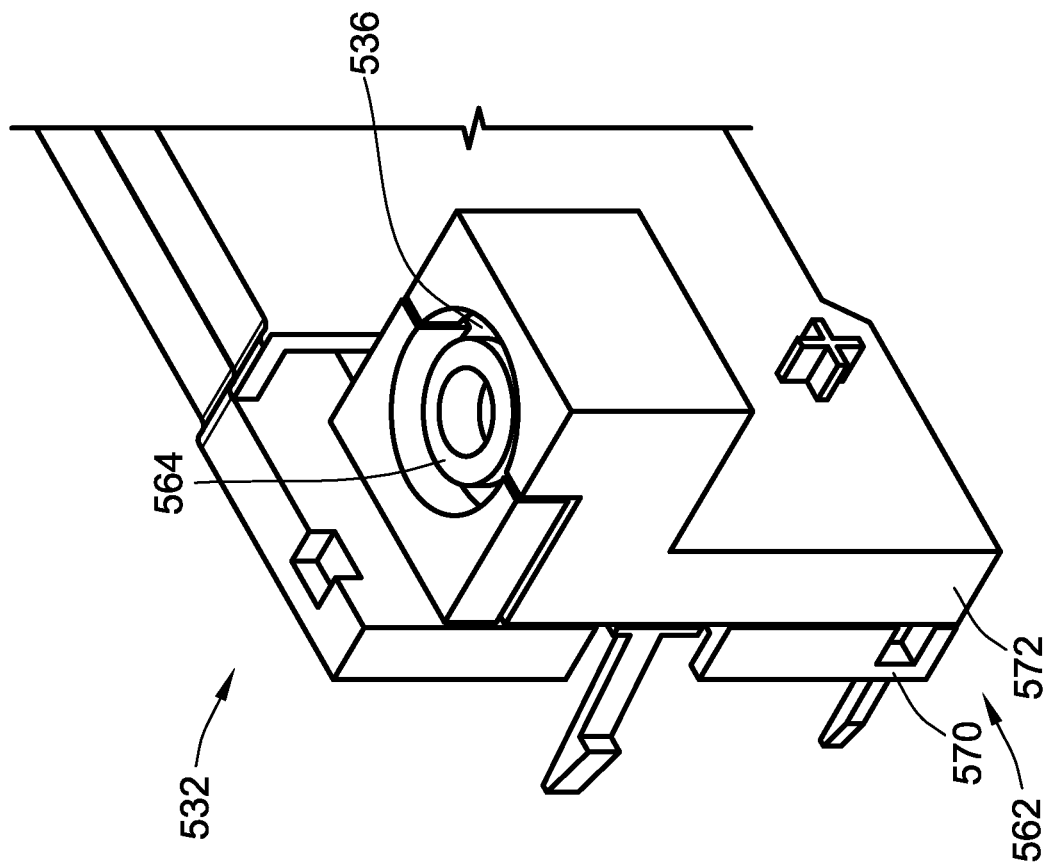
FIGS. 9A and 9B are partially exploded and assembled perspective-view illustrations, respectively, of a representative finger-proof electrical terminal with a tripartite construction employing a clamshell outer jacket and a discrete nut cap in accord with aspects of the disclosed concepts.
Figure 9A:
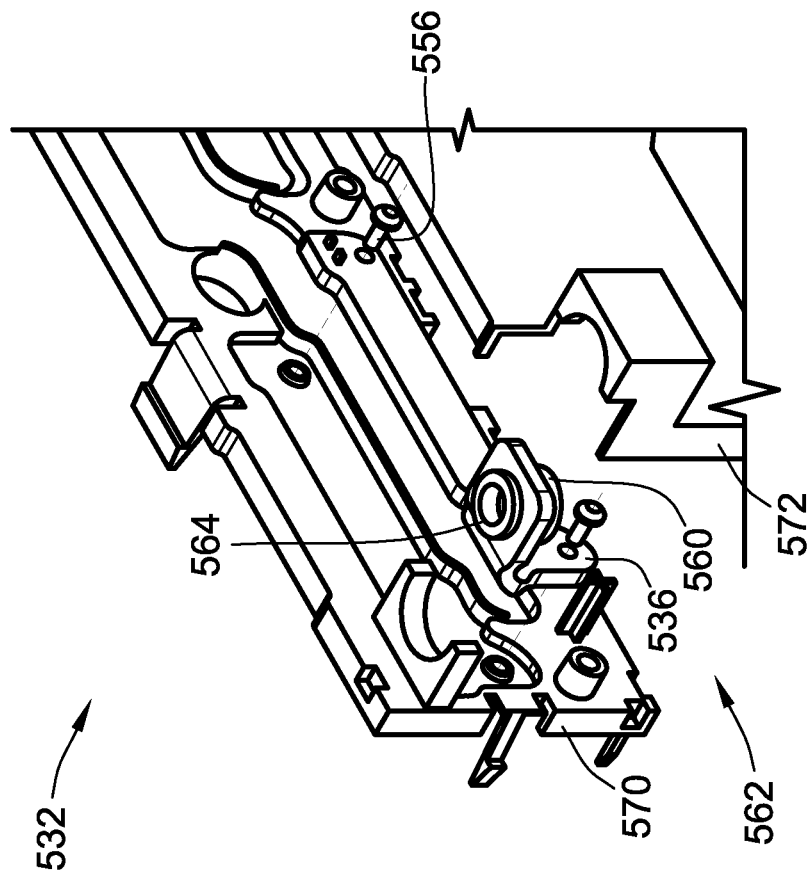

FIGS. 9A and 9B illustrate yet another representative finger-proof electrical terminal assembly 532 for a rechargeable battery module assembly. In this instance, the finger-proof electrical terminal assembly 532 is a three-piece construction that employs a clamshell-style terminal-shielding outer jacket 562 and a discrete nut cap 564. The bipartite outer jacket 562 includes an ICB inner frame 570 and an ICB outer cover 572. An electrical terminal 536, preassembled with a clinch nut 560 and nut cap 564, is mounted to the ICB inner frame 570, e.g., via threaded screws 556. The ICB frame and cover 570, 572 are then fastened together to cooperatively define the terminal jacket 562 and, at the same time, sandwich therebetween the electrical terminal 536.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A battery assembly for powering an electric load via an electrical connector, the battery assembly comprising:
    an electrochemical battery cell;

an electrical terminal electrically connected to the battery cell and having a contact face configured to electrically connect the battery assembly to the electrical connector;

a threaded nut configured to attach the electrical terminal to the electrical connector;

an electrically insulating nut cap attached to the threaded nut; and a battery housing storing therein the battery cell, the battery housing including an electrically insulating housing wall with a terminal jacket mounting therein the electrical terminal, the terminal jacket defining a jacket window circumscribing the nut cap and spaced therefrom by a predefined clearance sufficient to expose the contact face to abut with the electrical connector, wherein the nut cap and the terminal jacket are formed as a single-piece structure from a polymeric material, wherein the electrical terminal defines therethrough a bolt hole configured to receive a bolt, the threaded nut is mounted to the electrical terminal at one end of the bolt hole, and the bolt hole has a plurality of axially elongated slots receiving therethrough the polymeric material connecting the nut cap to the terminal jacket.

2. The battery assembly of claim 1, wherein the predefined clearance is a gap distance between an inner periphery of the jacket window and an outer periphery of the nut cap.

3. The battery assembly of claim 2, wherein the predefined clearance is 3 millimeters (mm) to 8 mm.

4. The battery assembly of claim 1, wherein the nut cap includes a hollow cylindrical end seated on a longitudinal end of the threaded nut and configured to receive therethrough the bolt.

5. The battery assembly of claim 1, wherein the jacket window is circular, the nut cap is toroidal, and the jacket window is concentrically aligned with the nut cap.

6. The battery assembly of claim 1, wherein the housing wall further includes an outer frame protruding from the terminal jacket and circumscribing the jacket window.

7. The battery assembly of claim 1, wherein the electrical terminal has an elongated body with a flange projecting from the elongated body, the contact face located on a first side of the flange, and the threaded nut mounted on a second side of the flange opposite the contact face.

8. The battery assembly of claim 7, wherein the elongated body of the electrical terminal includes a contact surface abutting an electrical tab of the battery cell, and wherein the terminal jacket defines therethrough another jacket window exposing the contact surface.

9. The battery assembly of claim 1, wherein the threaded nut includes an outer surface with a recessed groove, and the nut cap includes an inner surface with an inwardly projecting rib or nub snap-fit into the recessed groove thereby mounting the nut cap on the threaded nut.

10. The battery assembly of claim 1, wherein the electrical terminal includes a plurality of countersunk holes, and the nut cap includes an end surface with a plurality of axially projecting nubs press-fit into the countersunk holes thereby mounting the nut cap on the contact face of the electrical terminal.

11. The battery assembly of claim 1, wherein the housing wall includes a frame and a cover mounted to the frame to cooperatively define the terminal jacket and sandwich therebetween the electrical terminal.

12. The battery assembly of claim 1, wherein the threaded nut is a clinch nut or a T-nut self-anchored to the electrical terminal.

13. An electric-drive vehicle comprising:
a vehicle body with multiple road wheels;
a traction motor mounted on the vehicle body and operable to drive one or more of the road wheels to thereby propel the electric-drive vehicle; and
a traction battery pack mounted on the vehicle body and operable to power the traction motor, the traction battery pack including the battery assembly of claim 1.

14. A method of manufacturing the battery assembly of claim 1, the method comprising:
locating the electrochemical battery cell within the battery housing;
mounting the electrical terminal in the terminal jacket;
electrically connecting the electrical terminal to the battery cell;
attaching the threaded nut to the electrical terminal; and
attaching the electrically insulating nut cap to the threaded nut.

15. The method of claim 14, wherein the predefined clearance is a gap distance between an inner periphery of the jacket window and an outer periphery of the nut cap, and wherein the predefined clearance is 3 millimeters (mm) to 8 mm.

16. The method of claim 14, wherein mounting the electrical terminal to the terminal jacket and attaching the nut cap to the threaded nut includes overmolding the nut cap and the terminal jacket onto the electrical terminal and the threaded nut.

17. The method of claim 14, wherein the jacket window is circular, the nut cap is toroidal, and the jacket window is concentrically aligned with the nut cap.

* * * * *